(12) United States Patent
Strahm et al.

(10) Patent No.: US 6,892,224 B2
(45) Date of Patent: May 10, 2005

(54) NETWORK INTERFACE DEVICE CAPABLE OF INDEPENDENT PROVISION OF WEB CONTENT

(75) Inventors: Frederick William Strahm, Hillsboro, OR (US); Ylian Saint-Hilaire, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 446 days.

(21) Appl. No.: 09/945,235

(22) Filed: Aug. 31, 2001

(65) Prior Publication Data

US 2003/0046337 A1 Mar. 6, 2003

(51) Int. Cl.[7] .............................................. H04L 12/50
(52) U.S. Cl. ...................................... 709/213; 709/229
(58) Field of Search ................................ 709/213, 218, 709/229, 249, 250, 251

(56) References Cited

U.S. PATENT DOCUMENTS

| | | | | |
|---|---|---|---|---|
| 6,055,236 A | * | 4/2000 | Nessett et al. ............... | 370/389 |
| 6,473,840 B2 | * | 10/2002 | Matthews et al. ........... | 711/154 |
| 6,549,934 B1 | * | 4/2003 | Peterson et al. ............. | 709/203 |
| 6,584,567 B1 | * | 6/2003 | Bellwood et al. ............ | 713/171 |
| 6,742,043 B1 | * | 5/2004 | Moussa et al. .............. | 709/232 |
| 2002/0009079 A1 | * | 1/2002 | Jungck et al. ............... | 370/389 |
| 2002/0091844 A1 | * | 7/2002 | Craft et al. .................. | 709/230 |
| 2002/0107949 A1 | * | 8/2002 | Rawson, III ................. | 709/223 |
| 2002/0120782 A1 | * | 8/2002 | Dillon et al. ................ | 709/246 |
| 2002/0161767 A1 | * | 10/2002 | Shapiro et al. ................ | 707/9 |
| 2002/0184441 A1 | * | 12/2002 | Wong et al. ................. | 711/113 |
| 2003/0172145 A1 | * | 9/2003 | Nguyen ....................... | 709/223 |
| 2003/0233423 A1 | * | 12/2003 | Dilley et al. ................. | 709/214 |
| 2004/0073707 A1 | * | 4/2004 | Dillon ......................... | 709/245 |

* cited by examiner

*Primary Examiner*—Reba I. Elmore
(74) *Attorney, Agent, or Firm*—Fish & Richardson P.C.

(57) ABSTRACT

Web server operations are off loaded to a network interface device, such as a network interface card. The device includes a physical interface to interconnect a network and a web server, and a storage mechanism for web content provided by the web server. The device is capable of independent provision of web content, such as frequently requested content of web pages, thus reducing load on the web server and its storage mechanism. Additional new elements and operations for a network interface device, and a web server system in which it operates, are also described.

42 Claims, 6 Drawing Sheets

NETWORK INTERFACE DEVICE CAPABLE OF INDEPENDENT PROVISION OF WEB CONTENT

BACKGROUND

This invention relates to providing web services using an interface.

Referring to FIG. 1, a network configuration 100 illustrates an example client/server network setup. In the network configuration 100, clients 102(1)–102(N) can each request information from a host computer 104 across a network 106. (N represents a whole number.) The client 102(1), for example, may send a request across the network 106 for a particular set of web content available at the host computer 104, for a multimedia exchange to be set up between the client 102(1) and the host computer 104, or for another exchange or set of web content.

The request arrives at the host computer 106 at a network interface card (NIC) 108. From the NIC 108, the request can travel along an input/output (I/O) bus 110 and through a network stack 112 to a web server 114 running web server software.

The web server 114 handles the request (including any necessary connection setup and information retrieval) and, if necessary, reads information from a local storage mechanism 116 such as a buffer or a data cache. The web server 114 may then return any content requested by the client 102(1) to the client 102(1), with the content traveling through the network stack 112, the I/O bus 110, the NIC 108, and the network 106.

DESCRIPTION

Figure 1:
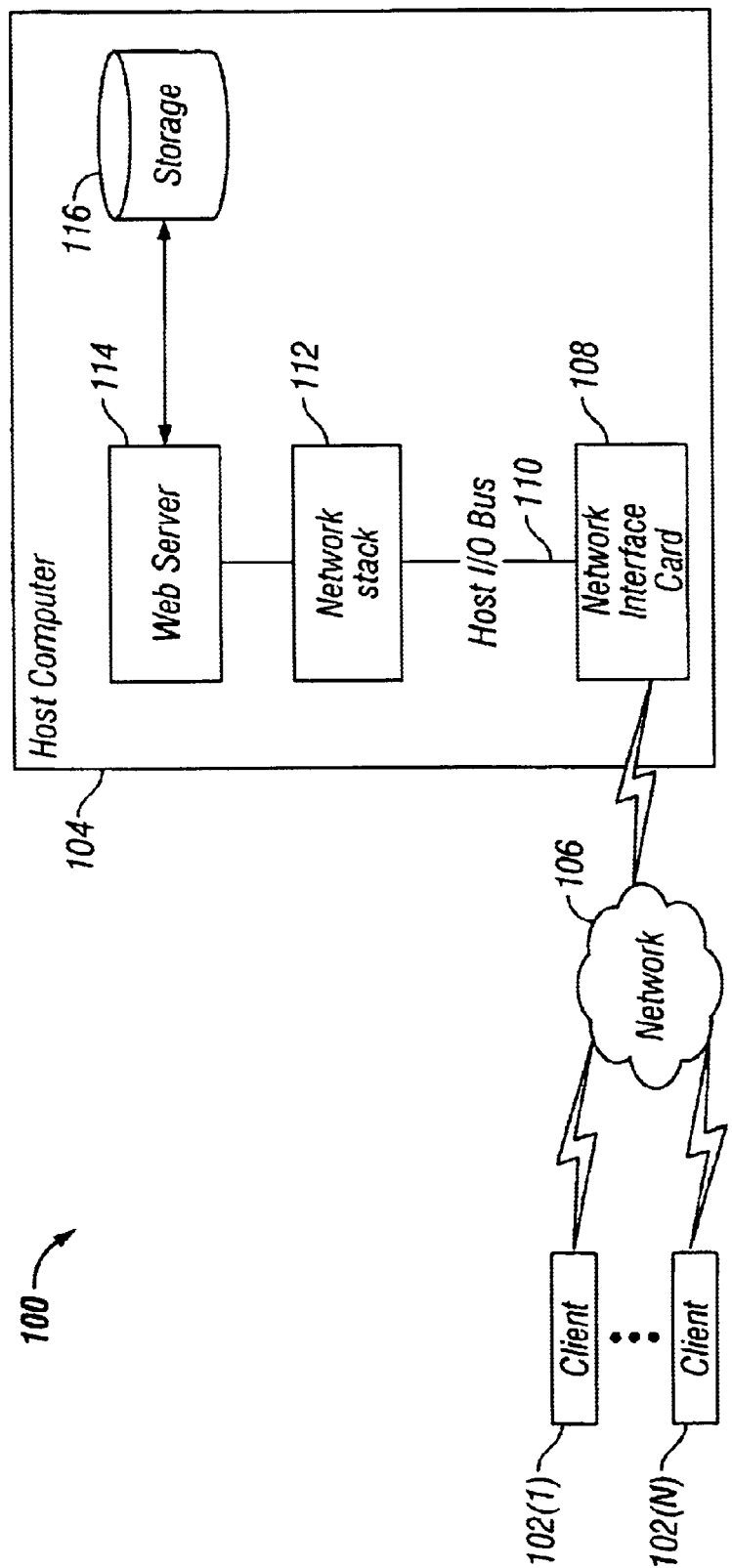
FIG. 1 (PRIOR ART) is a block diagram of a network configuration.
Figure 2:
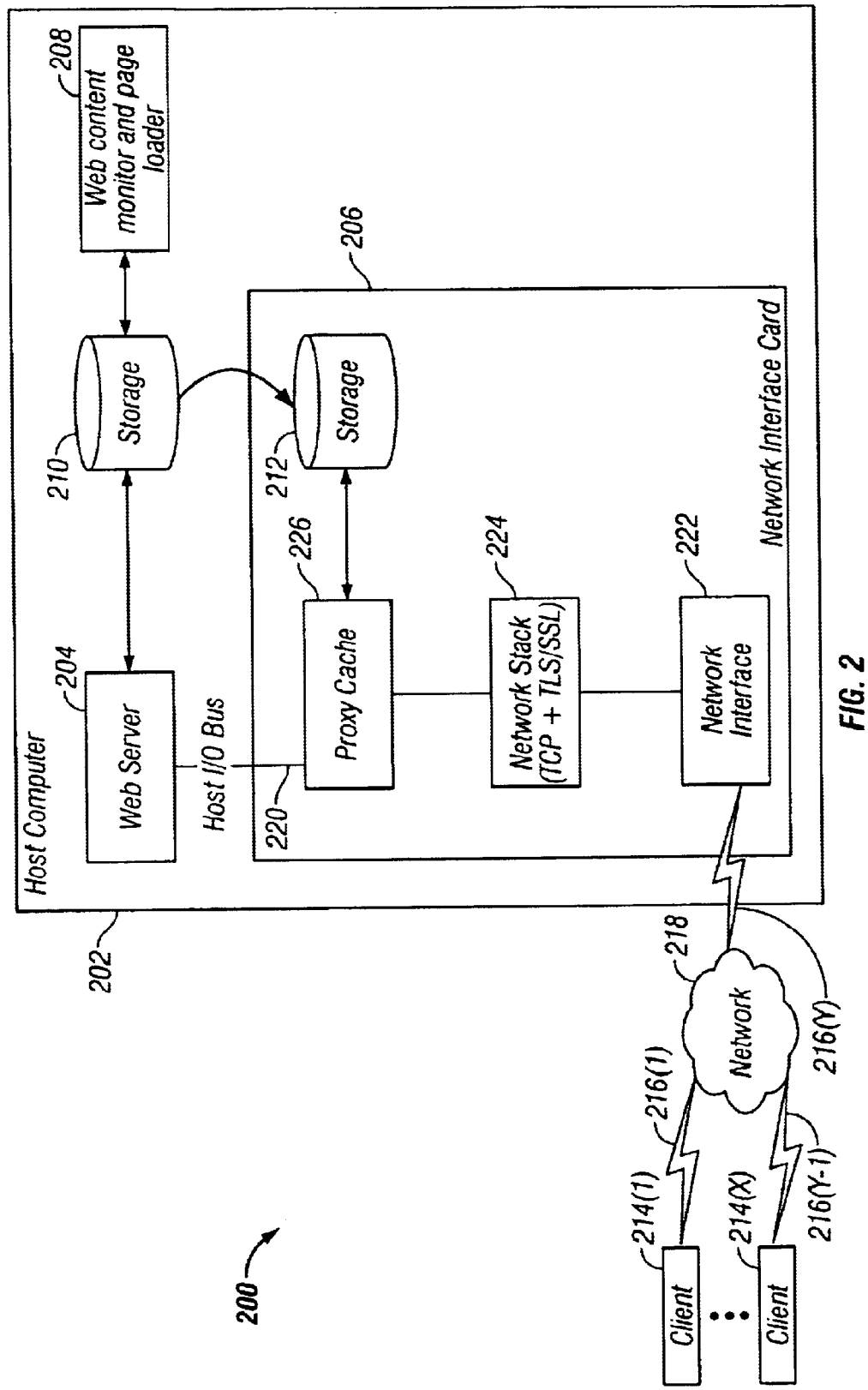
FIG. 2 is a block diagram of a network configuration including a server enabled interface.

Referring to FIG. 2, a network configuration 200 shows an example client/server network setup including a host computer 202 that includes a web server 204 capable of offloading one or more web server operations to an interface 206. A web content monitor and page loader 208 ("monitor 208") can transmit web content (static, new, and/or updated web content) from a storage mechanism 210 accessible by the web server 204 to an interface storage mechanism 212 included in or otherwise accessible by the interface 206. In this way, the interface 206 can handle much of the web content delivery to clients 214(1)–214(X) that request web content from the host computer 202. (X represents a whole number.)

When one of the clients 214(1)–214(X) (generically referred to as the client 214) sends a request for a connection setup and for web content to the host computer 202 across one or more communication links 216(1)–216(Y) and a network 218, the interface 206 receives the request. (Y represents a whole number.) If the interface storage mechanism 212 includes the web content requested by the client 214, then the interface 206 can independently respond to the request by setting up the connection and by transmitting the web content to the client 214 without any work by other elements included in the host computer 202, e.g., the web server 204, the storage mechanism 210, etc. In responding to the request, the interface 206 may use a network interface 222, a network stack 224, and a proxy cache 226, each described further below.

If the interface storage mechanism 212 does not include the requested web content or the interface 206 can otherwise not handle the request for any reason, then the interface 206 can forward the request to the web server 204 via a host input/output (I/O) bus 220.

Even if the interface 206 responds to the request, the interface 206 may notify other elements included in the host computer 202 of the request and the interface's response to the request for logging, auditing, and/or other purposes. For example, the interface 206 may notify the monitor 208 that a request was received and responded to so that the monitor 208 can keep an accurate log of requests received by the host computer 202.

Thus, the web server 204 and/or other elements included in the host computer 202 need not perform connection setup work as the network interface 206 can perform the connection setup work. In this way, the web server 204 and/or the other elements included in the host computer 202 can work on more dynamic operations such as updating web content, possibly increasing the total capacity of the web sever 204 and reducing response time of the host computer 202 to requests from the clients 214(1)–214(X).

In a general example, the client 214 may include a desktop computer, the network 218 may include the Internet, and the host computer 202 may include a server that hosts a web page. The client 214 may send a request to connect to the host computer 202 via a hypertext transfer protocol (HTTP) connection to request a particular set of web content (e.g., contents of a particular web page). The interface 206 receives the request, sets up the connection between the host computer 202 and the client 214, and checks the interface storage mechanism 212 for the web content. If the interface storage mechanism 212 includes the web content, then the interface 206 can transmit the web content to the client 214 without the web server 204 having to perform any Transmission Control Protocol/Internet Protocol (TCP/IP) processing, security processing, or web content delivery processing.

If, however, the interface storage mechanism 212 does not include the web content, then the interface 206 can forward the request to the web server 204 which can handle the request. The web server 204 can query the storage mechanism 210 for the web content and, if the web content is available from the storage mechanism 210, transmit the web content to the client 214. The web content may not be available at the storage mechanism 210 if, for example, the client 214 requests outdated web content, the client 214 addresses its request to the incorrect host, the client 214 sends a malformed request, and/or the storage mechanism 210 is unavailable.

Before further discussing offloading web server operations to the interface 206, the elements in the network configuration 200 are further described.

The elements in the network configuration 200 can be implemented in a variety of ways. Information communicated between the clients 214(1)–214(X) and the host computer 202 can include data, instructions, or a combination of the two. The information may be in packets. Each sent packet may be part of a packet stream, where each of the packets included in the packet stream fits together to form a timewise contiguous stream of data. Information may be communicated between endpoints via multicast, unicast, or some combination of both.

The clients 214(1)–214(X) can each include any mechanism or device capable of communicating with the host computer 202 through the network 218. Examples of the clients 214(1)–214(X) include workstations, stationary personal computers, mobile personal computers, servers, personal digital assistants, telephones, and other similar mechanisms and devices. The clients 214(1)–214(X) in the network configuration 200 may differ from each other. Although multiple clients are shown in the network configuration 200, there may be only one client that can access the host computer 202 through the network 218.

The network 218 can include any kind and any combination of networks such as an Internet, a local area network (LAN), a wide area network (WAN), a private network, a public network, or other similar network. Communications through the network 218 may be secured with a mechanism such as IP security (IPsec), Transport Layer Security/Secure Socket Layer (TLS/SSL), wireless TLS (WTLS), secure Hypertext Transfer Protocol (S-HTTP), or other similar security mechanism. The network stack 224 should be configured to handle information secured through whatever security mechanism employed by the network 218. Otherwise, a request sent by one of the clients 214(1)–214(X) might fail and go unfulfilled.

The network 218 may include a LAN set up as an Ethernet. Examples of an Ethernet include a 10BaseT Ethernet, a Fast Ethernet, a Gigabit Ethernet, a ten Gigabit Ethernet, and other similar faster and slower Ethernets. A 10BaseT Ethernet generally refers to an Ethernet setup that transmits information at ten Megabits per second (Mbps). A Fast Ethernet generally refers to an Ethernet setup using a 100BaseT Ethernet, also called the Fast Ethernet standard (Institute of Electrical and Electronics Engineers (IEEE) standard 802.3u, adopted 1995), that transmits information at one hundred Mbps. A Gigabit Ethernet generally refers to an Ethernet setup that transmits information at 1000 Mbps using IEEE standard 802.3z (adopted 1998). A ten Gigabit Ethernet generally refers to an Ethernet setup that transmits information ten times as fast as a Gigabit Ethernet using IEEE standard 802.3ae (first draft adopted 2000).

The web server 204 can include any device capable of communicating with the network 218 such as a file server, an application server, a database server, a mobile computer, a stationary computer, or other similar device.

The monitor 208 can include any device or mechanism capable of performing administrative tasks such as monitoring web content updates, keeping track of the frequency and/or number of requests received at the host computer 202, auditing the host computer's performance, and performing other similar tasks. The monitor 208 may be set up or include as an application to perform such tasks.

The interface 206 can include any mechanism or device capable of providing a connection between the web server 204 and the network 218. For example, the interface 206 may include a NIC. An NIC generally refers to a mechanism that provides a physical interface between a network (technically, usually to a communication link to the network) and a server (technically, usually to a bus leading to the server). The NIC may be capable of handling any number of maximum bits, such as eight bits, sixteen bits, thirty-two bits, or any other number of bits, as long as the NIC can handle the speed of the network 218, which could equal or exceed one gigabit or even ten gigabits.

The host computer 202 can include any device capable of communicating with the network 218. Examples of such devices include a mobile computer, a stationary computer, a workstation, a server, a telephone, a pager, a personal digital assistant, and other similar devices. The host computer 202 may include any number of servers similar to the web server 204 and any additional architecture needed to support the additional servers.

The storage mechanism 210 and the interface storage mechanism 212 can each include a storage mechanism such as a data queue, a buffer, a local or remote memory device, random access memory (RAM), a cache, or other similar mechanism. The mechanisms used for the storage mechanism 210 and the interface storage mechanism 212 may differ from each other. Furthermore, the interface storage mechanism 212 typically includes a rapid storage mechanism (e.g., RAM, Flash Erasable Programmable Read Only Memory (FEPROM or Flash memory), and other similar mechanisms) that enables the proxy cache 226 to quickly and easily access information stored at the interface storage mechanism 212.

The proxy cache 226 can include any device or mechanism capable of storing (usually temporarily) web content As the interface storage mechanism 212 receives updates from the storage mechanism 212, the proxy cache 226 should also be able to update its stored web content.

The network stack 224 can include a protocol stack of protocols used in network communications such as TCP/IP, TLS/SSL, those included in the Open System Interconnection (OSI) model, and other similar protocols.

The network interface 222 can include any device or mechanism capable of handling a request from the network 218 and forwarding to and/or translating the request for other elements included in the interface 206.

The host I/O bus 220 can include a peripheral bus capable of carrying communication between the web server 204 and the interface 206.

The communication links 216(1)–216(Y) can include any kind and any combination of communication links such as modem links, Ethernet links, cables, point-to-point links, infrared connections, fiber optic links, wireless links, cellular links, Bluetooth, satellite links, and other similar links. Additionally, each of the communication links 216(1)–216(Y) may include one or more individual communication links.

Furthermore, the network configuration 200 is simplified for ease of explanation. The network configuration 200 may include more or fewer additional elements such as networks, communication links, proxy servers, hubs, bridges, switches, routers, firewalls or other security mechanisms, Internet Service Providers (ISPs), and other elements.

Figure 3:
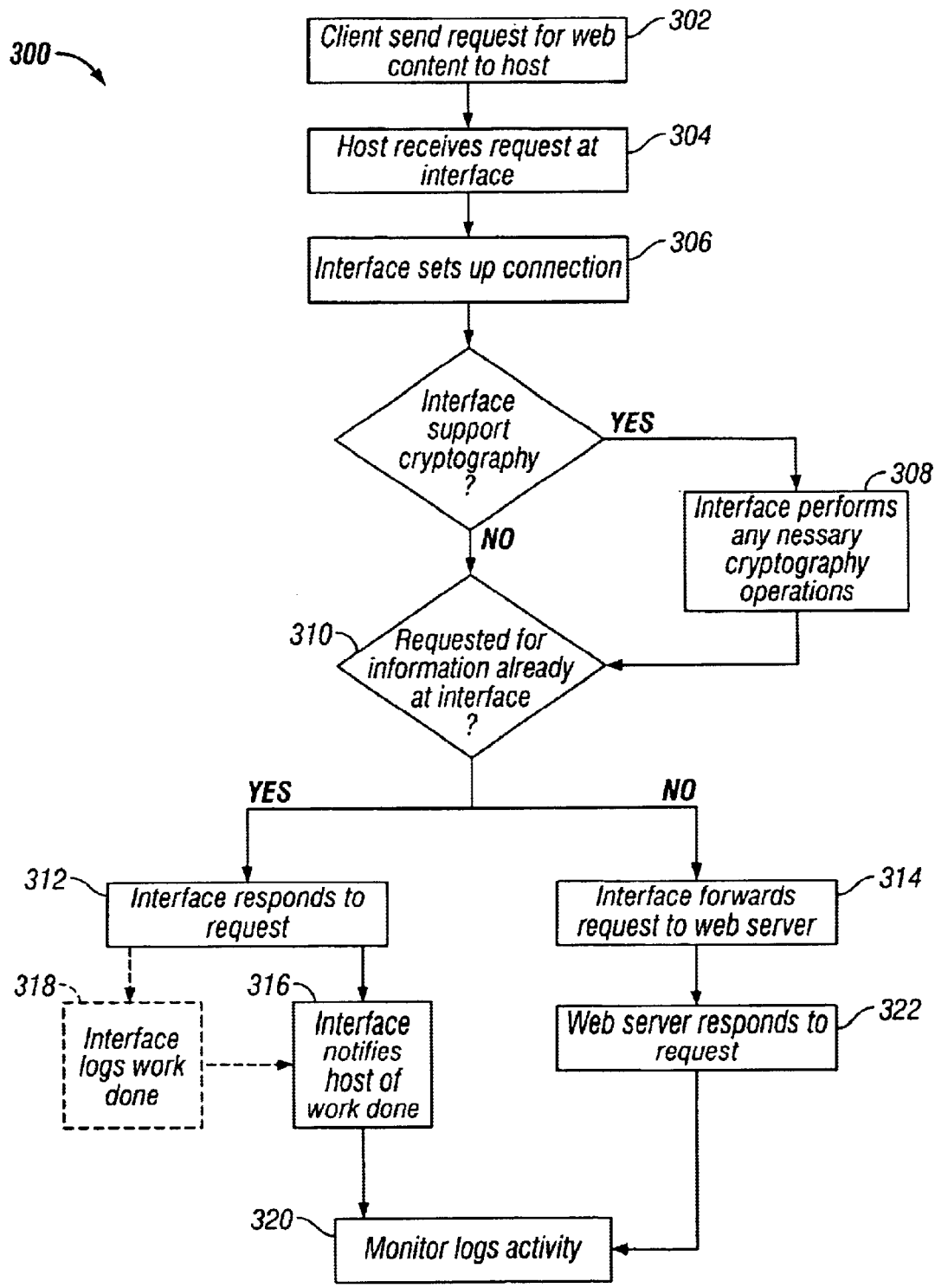
FIG. 3 is a flowchart showing a process of responding to a request for web content.

Referring to FIG. 3, a process 300 shows an example of offloading work from the web server 204 to the interface 206. Although the process 300 is described with reference to the elements included in the network configuration 200 of FIG. 2, this or a similar process may be performed in another, similar network configuration.

In the process 300, the client 214 sends 302 a request to the host computer 202. In this example, the request is for a connection setup between the client 214 and the host computer 202 and for a particular set of web content from the host computer 202. The request can, however, be for a connection setup, for web content, for a connection setup and for web content, or for other similar services and content.

The client 214 may send the request in response to a user of the client 214 entering a name or address into a browser running on the client 214. The name or address may include a uniform resource indicator (URI), a uniform resource locator (URL), a universal naming convention (UNC) address, or other similar name or address.

The request traverses to the host computer 202 through one or more of the communication links 216(1)–216(Y) and the network 218. The host computer 202 receives 304 the request at the interface 206, specifically, at the network interface 222.

The interface 206 may then set up 306 a connection between the host computer 202 and the client 214. Setting up the connection may include the interface 206, via the network stack 224, performing TCP (or other protocol, as appropriate) connection operations, including checksum operations. In this way, the web server 204 need not perform any connection setup operations, instead offloading such operations to the interface 206.

Furthermore, with the interface 206 handling connection setup operations, communications on the host I/O bus 220 between the web server 204 and the interface 206 may not involve transmission of TCP/IP packets (or other protocol information, as appropriate). Rather, the interface 206 can send high layer socket calls (e.g., Berkeley Socket calls using Berkeley UNIX, Windows Socket (Winsock) calls, transport level interface (TLI) calls, and other types of similar calls) to the web server 204 on the host I/O bus 220. In this way, the interface 206 can relieve the web server 204 from performing TCP/IP (or other protocol, as appropriate) processing.

The request may require security processing before the host computer 202 can respond to the client 214. The interface 206 may include one or more cryptography or security processing capabilities, such as TLS/SSL, in the network stack 224 that can so process the request. If the network stack 224 supports cryptography capabilities (and the request requires cryptography processing), then the network stack 224 can perform 308 any necessary cryptography operations. In this way, even if the interface 206 cannot provide the client 214 with its requested web content, the interface 206 can relieve the web server 204 of performing any cryptography processing. As cryptography processing can involve resource-intensive, time-consuming operations, the interface's cryptography processing could significantly reduce the amount of processing done by the web server 204.

If the network stack 224 does not support cryptography processing or after the network stack 224 performs 224 any necessary cryptography operations, the interface 206 determines 310 if the interface storage mechanism 212 and/or the proxy cache 226 includes the requested web content. Depending on the outcome of this determination, either the interface 206 or the web server 204 provides the web content to the client 214.

The interface 206 may make this determination by consulting a mapping table. The interface storage mechanism 212 may include the mapping table or the mapping table may otherwise be accessible to the interface 206. The mapping table can include correlations between names and addresses (e.g., URLs) and web content. Each name and address may correspond to one set of web content and/or multiple names and addresses may correlate with the same set of web content to deal with different web configuration issues.

If the mapping table includes the name or address provided by the client 214, then the interface 206 includes the requested web content and can respond 312 to the client's request. Otherwise, the interface 206 likely does not include the requested web content or the most up-to-date version of the requested web content, so the web server 204 handles 314 the request for web content.

If the interface 206 responds to the client's request, then the interface 206 retrieves the requested web content from the interface storage mechanism 212 and/or the proxy cache 226 as appropriate. By storing web content (including static web content) at the storage mechanism 212 and/or the proxy cache 226, web content can be located closer to the interface 206 than if the web content is stored elsewhere, e.g., at the storage location 210. Furthermore, storing web content at the interface storage mechanism 212, can reduce the load on the storage mechanism 210. The interface 206 may also or instead retrieve a copy of the requested web content, a pointer to the requested web content, or other information regarding the web content that the interface 206 may send to the client 214 in response to the request. Having retrieved the web content, the interface 206 can transmit the web content to the client 214 via one or more of the communication links 216(1)–216(Y) and the network 218.

With the interface 206 responding to the request rather than the web server 204, bus traffic on the host I/O bus 220 between the interface 206 and the web server 204 may be reduced or eliminated because the interface 206 may not need to communicate the client's request to the web server 204 or receive web content via the host I/O bus 220 to return to the client 214.

After responding to the request, the interface 206 may notify 316 the web server 204 with information regarding the request and/or work performed by the interface 206. The interface 206 may also or instead provide the web server 204 with such information as it becomes available rather than waiting until after the interface 206 finishes responding to the request. Additionally, the interface 206 may log 318 information regarding the request and/or the work performed by the interface 206 in the interface storage mechanism 212. The interface 206 may then subsequently transmit the logged information to the web server 204 at a later time, e.g., after the interface 206 logs a certain number or amount of information, after a certain amount of time, etc., or the web server 204 can retrieve the logged information.

The information sent to the web server 204 can include data that the web server 204 may forward to the monitor 208 that the monitor 208 can use in logging, auditing, or otherwise tracking requests sent to the host computer 202 and/or examining the processes performed by the interface 206 and/or the web server 204. Such data may include information regarding the request such as the name or address used by the client 214 to contact the host computer 202, the location of the client 214 (e.g., network address), the time that the host computer 202 received the request, whether the web server 204 or the interface 206 responded to the request, and other similar types of information.

The monitor 208 can log 320 data sent from the interface 206 and/or the web server 204 and use the data in updating the web content included in the interface storage mechanism 212. For example, if the monitor 208 determines that clients request a particular web page with a certain frequency (e.g., a certain number of times in a certain number of seconds), then the monitor 208 may increase the frequency of updates for that web page sent to the interface storage mechanism 212.

If the web server 204 knows about the processing performed by the interface 206, then the host computer 202 need not include the monitor 208 as shown in the network configuration 200. Rather, the web server 204 may include a monitoring mechanism similar to the monitor 208.

If the mapping table does not include the name or address provided by the client 214 or the interface 206 can otherwise not respond to the request for any reason, then the web server 204 responds 322 to the request instead of the interface 206. The web server 204 retrieves the requested web content from the storage mechanism 210 or from its internal storage and can transmit the web content to the client 214 via the interface 206, one or more of the communication links 216(1)–216(Y), and the network 218.

The web server 204 may send information regarding the request and/or the work performed by the web server 204 to the monitor 208 which can log 302 the log information as described above. The interface 206 may also send information regarding the request and/or the work performed by the interface 206 to the monitor 208 even if the web server 204 responds to the request. For example, the interface 206 may hold responsibility for informing the monitor 208 about the frequency of requests received by the host computer 202.

Figure 4:
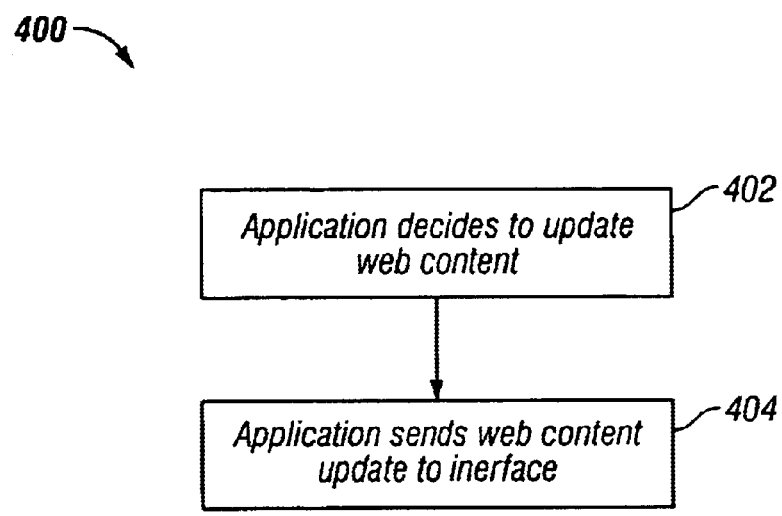
FIG. 4 is a flowchart showing a process of updating an interface.

Referring to FIG. 4, the monitor 208 may periodically send new and/or updated web content to the interface 206 as shown in a monitoring process 400. The monitoring process 400 is described with reference to the network configuration 200 of FIG. 2, but this or a similar process may be performed in another, similar network configuration.

At regularly scheduled intervals or as necessary, the monitor 208 can decide 402 to update the interface 206 with new and/or updated web content. The monitor may make such a decision when the storage mechanism 210 receives and stores new web content, after every "N" seconds (where N equals any positive number), or upon occurrence of another similar event or events.

When the monitor 208 decides to send an update to the interface 206, the monitor 208 can send 404 a web content update to the interface 206. The web content update may include new web content or revisions to web content already stored at the interface 206 in the proxy cache 226 and/or the interface storage mechanism 212.

An application included in or otherwise accessible by the monitor 208 may carry out the deciding and/or the sending. An application generally refers to one or more programs, functions, and/or other similar instructions capable of processing data and is typically implemented with software.

Furthermore, the monitor 208 may not be the mechanism that actually transmits the web content update to the interface 206. Rather, the monitor 208 may trigger another mechanism, such as the storage mechanism 210, to send or transfer the web content update to the interface 206.

Figure 5:
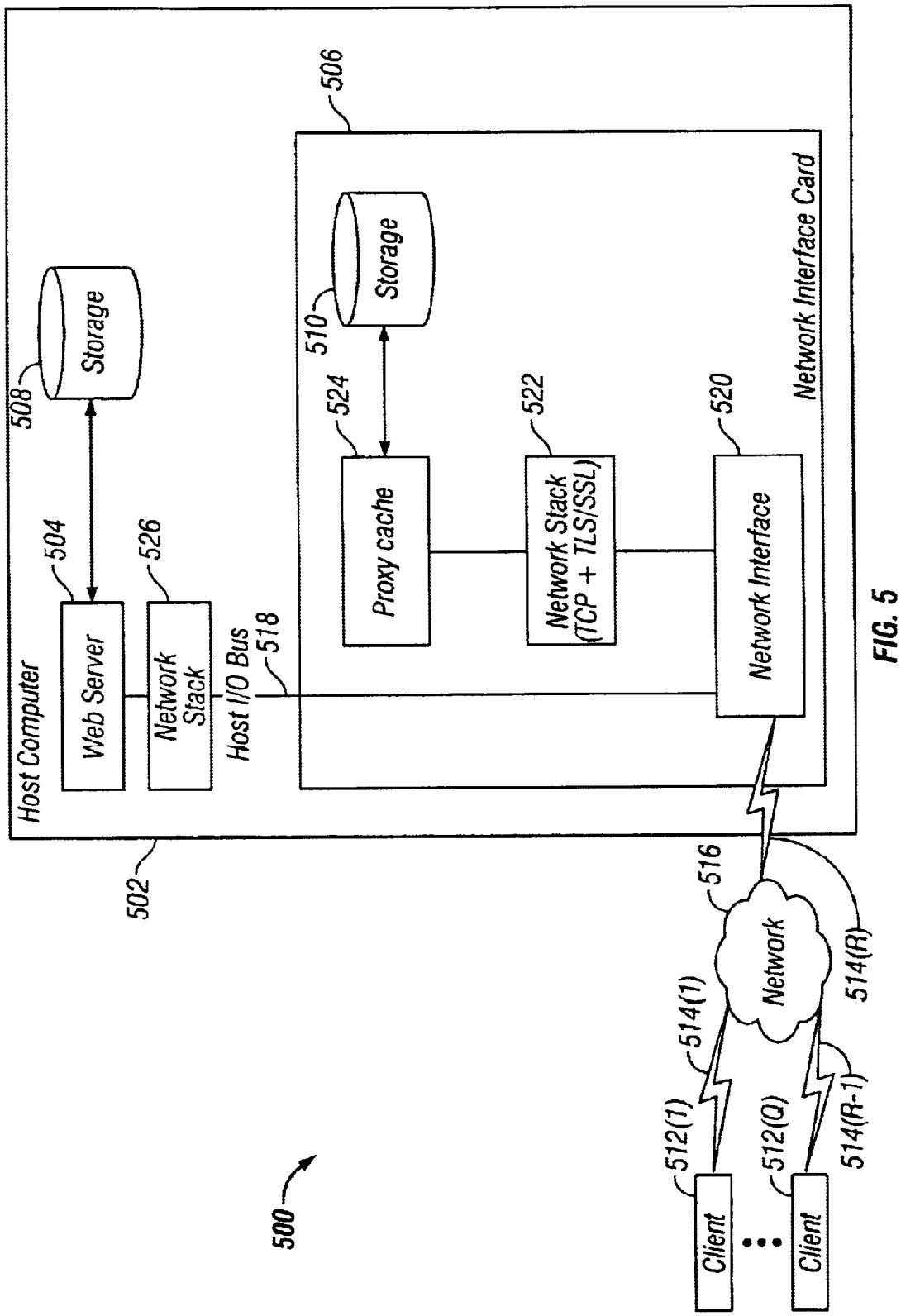
FIG. 5 is a block diagram of a network configuration including a cache enabled interface.

Referring to FIG. 5, a second network configuration 500 shows another example client/server network setup including a host computer 202 that includes a web server 504 capable of offloading one or more web server operations to an interface 506. The web server 504 and the interface 506 can each function and be implemented similar to like-named elements included in the network configuration 200 (see FIG. 2). Similarly, the second network configuration 500 also includes a storage mechanism 508, an interface storage mechanism 510, clients 512(1)–512(Q) (where Q represents whole number), communication links 514(1)–514(R) (where R represents whole number), a network 516, a host I/O bus 518, a network interface 520, a network stack 522, and a proxy cache 524 that can each function and be implemented as similarly-named elements in the network configuration 2 (see FIG. 2). The second network configuration 500 also includes a host network stack 526 that can function as described below and be implemented similar to the network stack 522 included in the interface 506.

In the second network configuration 500, the interface 506 can act as a web-cache enabled proxy. The web server 504 and the host network stack 526 do not have knowledge of the interface's ability to cache web content in the proxy cache 524. Additionally, the storage location 508 need not send data to the interface storage location 510.

Figure 6:
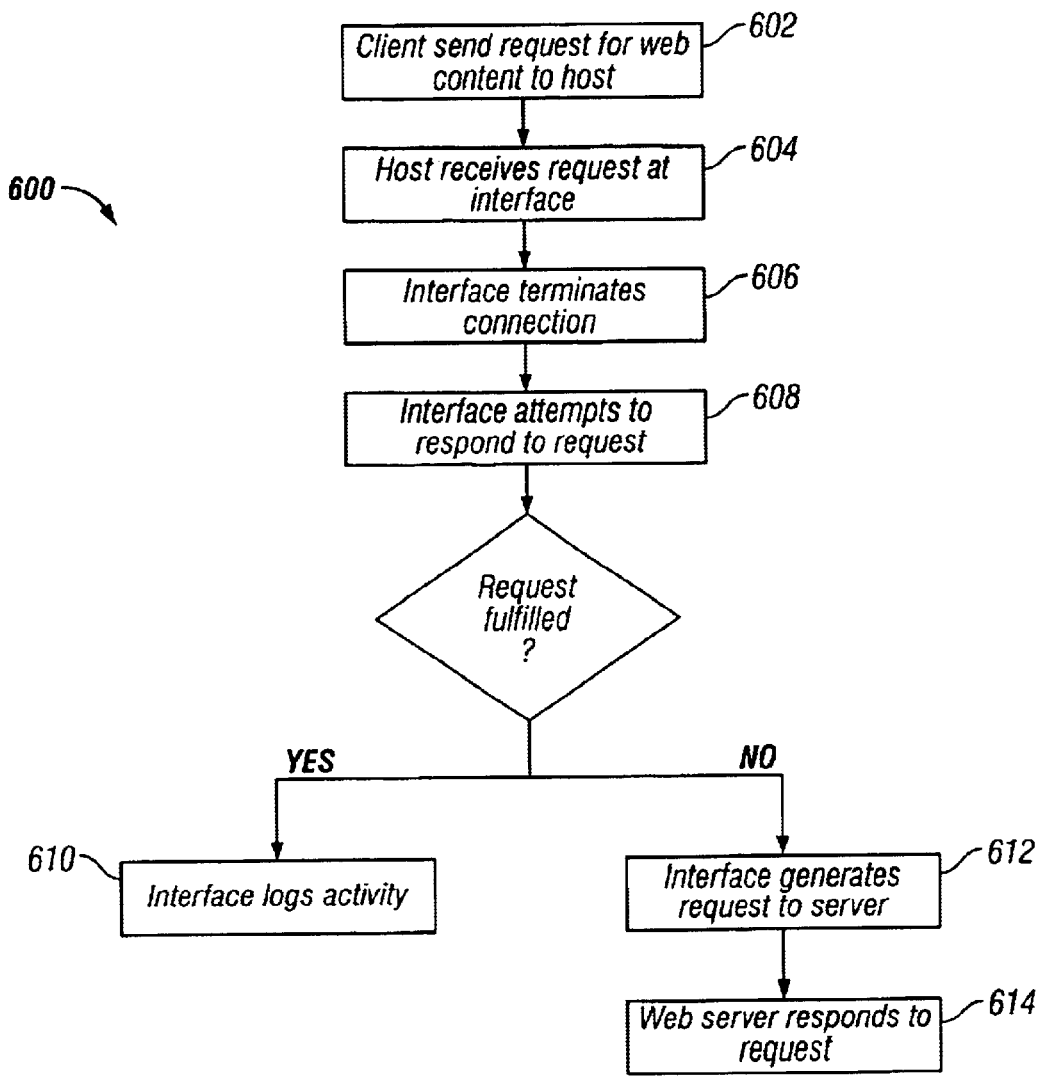
FIG. 6 is a flowchart showing a process of responding to a request for web content.

Referring to FIG. 6, a second process 600 shows an example of offloading work from the web server 504 to the interface 506. Although the second process 600 is described with reference to the elements included in the second network configuration 500 of FIG. 5, this or a similar process may be performed in another, similar network configuration.

In the second process 600, one of the clients 512(1)–512 (Q) (generically referred to as the client 512) sends 602 a request to the host computer 502 for a connection setup and for a particular set of web content although the request could include more or less individual requests. The host computer 502 receives 604 the request at the interface 506, specifically, at the network interface 520.

The network interface 520 terminates 606 incoming TCP connections (or connections under the appropriate protocol) and attempts 608 to respond to the request. The request may require security processing before the host computer 502 can respond to the client 512. The network stack 522 can perform any appropriate cryptography operations as described above with reference to FIG. 3 and the network stack 224 (see FIG. 2). The network stack 522 may perform such cryptography operations whether the interface 506 or the web server 504 responds to the request.

If the network interface 520 can respond to the request, then the network interface 520 appropriately responds to the client 512. Generally, the network interface 520 can respond to the request if the proxy cache 524 and/or the interface storage location 510 includes the requested web content. The network interface 520 may determine if the interface 506 includes the requested web content by consulting a mapping table or performing another similar check as described above with reference to FIG. 3.

If the network interface 520 can respond to the request, the interface 506 can log 610 information (e.g., in the interface storage mechanism 510) regarding the request and/or the work performed by the interface 206. For example, the interface 520 may log information to keep track of what web content the clients 512(1)–512(Q) most frequently request. The interface 506 may store this most frequently requested web content in a rapid storage mechanism so as to have it easily and quickly available for retrieval and delivery to the clients 512(1)–512(Q).

If the network interface 520 cannot respond to the request for any reason, then the network interface 520 generates 612 a request to the web server 504 to fulfill the client's request. The network interface 520 may generate such a request by opening a TCP connection (or connection using another protocol) with the web server 504 via the host network stack 526. The network interface 520 may then send the request to the web server 504 via the host I/O bus 518 and the host network stack 526. The web server 504 may then respond 614 to the request and, therefore, the client's request.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Other embodiments are within the scope of the following claims.

What is claimed is:

1. A method comprising:
   hosting content of a web page at a first mechanism that is capable of responding to a client request;
   storing at least some of the content at a network interface mechanism that is capable of independently responding to a client request and that is accessible by the first mechanism, wherein the network interface mechanism provides a physical interface between a network and the first mechanism; and
   providing at least some of the content stored at the network interface mechanism to a client in response to a request for content sent to the first mechanism by the client.

2. The method of claim 1 further comprising performing at the network interface mechanism security-related, operations involving the request.

3. The method of claim 1 further comprising performing at the network interface mechanism all transmission control protocol processing in fulfilling the request.

4. The method of claim 1 further comprising mapping at the network interface mechanism at least one network address to a particular set of content.

5. The method of claim 1 in which the content stored at the network interface mechanism includes content most often requested in requests sent to the first mechanism.

6. The method of claim 1 further comprising updating the network interface mechanism using updated content.

7. The method of claim 1 in which the network interface mechanism includes a network interface card.

8. The method of claim 1 in which the first mechanism includes a server.

9. The method of claim 1 further comprising providing the content to the client from the first mechanism if the network interface mechanism does not include the content.

10. The method of claim 1 further comprising providing information related to a client request from the network interface mechanism to the first mechanism if the network interface mechanism independently handles the client request.

11. The method of claim 10 in which the information includes an indication of content requested in the client request.

12. An article comprising;
    a machine-readable medium which contains machine-executable instructions, the instructions causing a machine to:
    host content of a web page at a first mechanism that is capable of responding to a client request;
    store at least some of the content at a network interface mechanism that is capable of independently responding to a client request and that is accessible by the first mechanism, wherein the network interface mechanism provides a physical interface between a network and the first mechanism; and
    provide at least some of the content stored at the network interface mechanism to a client in response to a request for content sent to the first mechanism by the client.

13. The article of claim 12 further causing a machine to perform at the network interface mechanism security-related operations involving the request.

14. The article of claim 12 further causing a machine to perform at the network interface mechanism all transmission control protocol processing in fulfilling the request.

15. The article of claim 12 further causing a machine to map at the network interface mechanism at least one network address to a particular set of content.

16. The article of claim 12 in which the content stored at the network interface mechanism includes content most often requested in requests sent to the first mechanism.

17. The article of claim 12 further causing a machine to update the network interface mechanism using updated content.

18. The article of claim 12 in which the network interface mechanism includes a network interface card.

19. The article of claim 12 in which the first mechanism includes a server.

20. The article of claim 12 further causing a machine to provide the content to the client from the first mechanism if the network interface mechanism does not include the content.

21. The article of claim 12 further causing a machine to provide information related to a client request from the network interface mechanism to the first mechanism if the network interface mechanism independently handles the client request.

22. The article of claim 21 in which the information includes an indication of content requested in the client request.

23. A system comprising:
    a server configured to host content of a web page and to respond to a client request; and
    a network interface device configured to communicate with the server, to store at least some of the content of the web page, and to independently provide at least some of the content stored at the interface in response to a request sent to the server for web content.

24. The system of claim 23 further comprising a stack included in the interface and configured to perform security-related operations involving the request.

25. The System of claim 23 in which the interface is also configured to perform all transmission control protocol processing in fulfilling the request.

26. The system of claim 23 in which the interface is also configured to map at least one network address to a particular set of content.

27. The system of claim 23 in which the content stored at the interface includes content most often requested in requests sent to the server.

28. The system of claim 23 further comprising a storage mechanism included in the interface and configured to store the content.

29. The system of claim 23 further comprising a storage mechanism accessible by the server and configured to store the content of the web page.

30. The system of claim 23 in which the storage mechanism is also configured to provide updates to the content to the interface.

31. The system of claim 23 further comprising a proxy included in the interface and configured to retrieve the content from storage.

32. The system of claim 23 in which the network interface device includes a network interface card.

33. The system of claim 23 in which the interface is also configured to provide the content in response to the request if the interface does not include the web content.

34. A network interface device comprising:
   a physical interface configured to interconnect a network and a web server;
   a rapid storage mechanism configured to store web content frequently provided by the web server in response to client requests; and
   a network stack configured to provide the web content stored in the rapid storage mechanism in response to a request sent to the web server.

35. The device of claim 34, wherein the network stack is further configured to perform security-related operations and transmission control protocol processing in fulfilling the request.

36. The device of claim 35, further comprising a component configured to send high layer socket calls to the web server.

37. The device of claim 35, further comprising a component configured to provide information related to fulfilling the request to the web server.

38. A system comprising:
   a web server;
   a remote storage mechanism operatively coupled with the web server, and
   a network interface device comprising:
   a physical interface configured to interconnect a network and the web server,
   a rapid storage mechanism configured to store web content frequently provided by the web server in response to client requests, and
   a network stack configured to provide the web content stored in the rapid storage mechanism in response to a request sent to the web server.

39. The system of claim 38, wherein the network stack is further configured to perform security-related operations and transmission control protocol processing in fulfilling the request.

40. The system of claim 39, further comprising a web content monitor and page loader, and wherein the network interface device is configured to send high layer socket calls to the web server.

41. The system of claim 39, wherein the network interface device is configured to provide information related to fulfilling the request to the web server.

42. The system of claim 39, wherein the network interface device comprises a network interface card.

* * * * *